United States Patent [19]

Schramm et al.

[11] 3,953,681

[45] Apr. 27, 1976

[54] COMBINED RECORDING AND SCANNING DEVICE FOR FACSIMILE TRANSMISSION

[75] Inventors: Jürgen Schramm, Norderstedt; Gerhard Krekow, Schenefeld, both of Germany

[73] Assignee: U.S. Philips Corporation, New York, N.Y.

[22] Filed: July 2, 1974

[21] Appl. No.: 485,205

[30] Foreign Application Priority Data

July 4, 1973 Germany............................ 2333952

[52] U.S. Cl............................................. 178/6.6 A
[51] Int. Cl.²............................................ H04N 1/24
[58] Field of Search........... 178/6.6 R, 6.7 R, 6.6 A; 346/74 J, 74 ES, 74 P

[56] References Cited
UNITED STATES PATENTS

| 3,007,049 | 10/1961 | McNaney | 178/6.6 A |
| 3,438,035 | 4/1969 | Howell | 346/74 J |
| 3,594,162 | 7/1971 | Simm et al. | 346/74 J |
| 3,663,748 | 5/1972 | Boon | 178/6.6 A |
| 3,689,935 | 9/1972 | Pressman et al. | 346/74 J |
| 3,765,027 | 10/1973 | Bresnick | 346/74 J |
| 3,789,259 | 1/1974 | Allen | 178/6.6 A |

*Primary Examiner*—Raymond F. Cardillo, Jr.
*Attorney, Agent, or Firm*—Frank R. Trifari; Simon L. Cohen

[57] ABSTRACT

Combined recording and scanning device for facsimile transmission in which recording is effected by means of an electrode system which comprises strip-shaped conductors the facing ends of which define a gap and a bore which extend at right angles to the conductors and is formed in a subjacent transparent insulating sheet and beneath which a back-electrode is disposed at a small distance. The scanning member is an electro-optical receiver which is placed on the electrode gap in the direction of the bore axis.

7 Claims, 1 Drawing Figure

U.S. Patent  April 27, 1976  3,953,681
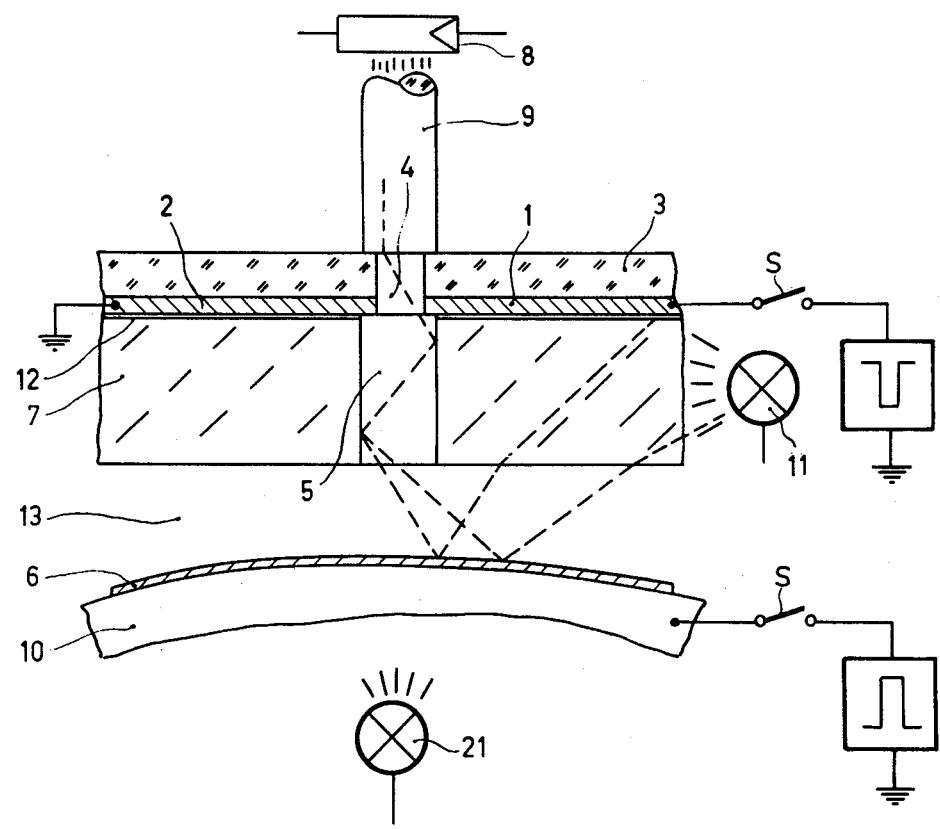

COMBINED RECORDING AND SCANNING DEVICE FOR FACSIMILE TRANSMISSION

The invention relates to a combined recording and scanning device for facsimile transmission using optical scanning and contactless electrostatic recording by an indirect charge carrier source.

In facsimile transmission a graphic subject copy is optically scanned in a transmitting apparatus and printed, for example electrostatically, in a recording apparatus. For carrying out such a printing operation a device has been proposed in which a non-printed record carrier is moved between an electrode system and a common back electrode. The electrode system comprises discrete conductive tracks which each include a discharge gap. All the discharge gaps are relatively arranged in the form of a mosaic so that reproduction of the scanned subject copy is effected in the form of a matrix.

The subject copy is scanned optically either by reflection or in that the light from a light source is transmitted through a transparent picture. This optical scanning may also be effected according to a matrix.

It is an object of the present invention to constructionally combine such a scanning device and recording device and using as many components as possible in common for both devices. This is achieved in that the device according to the invention is provided with an electrode system which comprises co-planar strip conductors the facing ends of which define a gap, an insulating sheet which is arranged beneath and parallel to the conductors and is formed with a bore which extends at right angles to the plane of the sheet, and a back electrode spaced from the sheet, while the device further includes an electro-optical scanning element adapted to intercept the light incident on the electrode gap through the bore.

Depending upon the specific use, the illuminating device may be located in line with the axis of the bore beneath a transparent record carrier or laterally of the insulating sheet which the light from the source of light is diffusely incident on the record carrier to be reflected thereby. When the device has a plurality of bores which are arranged in a line or are densely distributed over a given area, the scanning elements may be mounted on the device at another location. In this case the light beams are supplied to the scanning elements through the bores via light guides.

In another embodiment of the invention the potentials at the electrodes of the device when used as a printer are variable to enable grey tones to be reproduced.

An embodiment of the invention will now be described, by way of example, with reference to the accompanying diagrammatic drawing the single FIGURE of which shows, highly magnified and partly in cross-section, a part of a device according to the invention.

Referring now to the FIGURE, a subject copy is scanned in a large number of picture elements. Each picture element is converted into electric pulses which are transmitted to the recording device. In the recording device the pulses are used to control an electrode system which comprises discrete strip conductors. Each conductor comprises two separate parts 1 and 2 which are provided as strip conductors on a ceramic substrate 3 and define a discharge gap 4. The incoming picture pulses are amplified and then applied to the relevant strip electrode in the discharge gap 4 of which they produce a spark or glow discharge. Owing to a back voltage set up at a back electrode 10, to which it may be applied in the form of pulses also, the electric charge formed in the discharge gap 4 is conducted away through a bore extending at right angles to the discharge gap 4 and is stored in the highly insulating layer of a record carrier 6. The bores 5 are formed in an insulating sheet 7 which in the embodiment shown is made of a transparent material, for example glass. The insulating sheet 7 preferably is 0.5 mm thick. Depending upon the resolution at which the picture is to be reproduced the bore diameter is from 0.2 mm to 0.3 mm. The spacing 13 between the lower surface of the insulating sheet 7 and the upper surface of the record carrier 6 is about 0.1 mm to 1 mm and is not critical. The back electrode need not be a drum 10 on which the record carrier 6 is mounted but may alternatively be a plane support. The voltage across the gap 4 is about −1200 volts with a pulse duration of 30 $\mu s$. The voltage of the back electrode is variable from 0 volt to +1200 volts with a pulse duration of 35 $\mu s$. The said variation enables not only the black-and-white tones but also the intermediate grey tones to be reproduced.

The printing device described may also be used for scanning the subject copy. For this purpose an optical scanning element 8 is associated with each bore 5 above the ceramic member 3. The electro-optical scanning element 8 may be disposed at any desired location if the transmission of the scanning signal takes place through light guides 9.

The subject copy which now is mounted on the drum 10 instead of the recorded copy 6 is illuminated by a source of light 11 via the insulating sheet 7. The surface of the insulating sheet 7 facing the subject copy 6 and the walls of the bore 5 may be reflecting. Alternatively in the case of transparent subject copies 6 a source of light 21 may be disposed inside the (transparent) drum 10 or beneath a corresponding plane support for the subject copy 6, scanning being effected by transmission.

During scanning of a subject copy the voltages set up across the electrode system 1, 2 and at the back electrode 10 can be switched off by means of a switch S.

We claim:

1. Combined recording and scanning device for facsimile transmission using optical scanning and contactless electrostatic recording by an indirect charge carrier source, comprising an electrode system in the form of co-planar strip-shaped conductors (1, 2) having facing ends defining a gap (4), an insulating sheet (7) which is arranged beneath and parallel to the plane of the said conductors and is formed with a bore (5) which extends at right angles to said plane at the location of the gap (4), and a back electrode (10) which is disposed beneath the sheet and spaced therefrom by a distance (13), the device further including an electro-optical scanning element (8) adapted to intercept light incident on the gap (4) through the bore.

2. Device as claimed in claim 1, wherein for optical scanning of a transparent subject copy by transmitted light an illuminating device (21) is arranged in line with the bore axis.

3. Device as claimed in claim 1, wherein for optical scanning of a subject copy (6) by reflected light a source of light (11) is disposed laterally of the end faces of the insulating sheet (7).

4. Device as claimed in claim 1, wherein the insulating sheet (7) is transparent in the wavelength range suitable for scanning and that the walls of the bore (5) and the surface (12) of the insulating sheet (7) more remote from the subject copy (6) are reflecting.

5. Device as claimed in claim 1, wherein a plurality of bores (5) are formed in the insulating sheet (7) and are arranged together with associated electrodes (1,2) and scanning elements (8) in a line or are distributed in the form of a matrix in an area.

6. Device as claimed in claim 1, wherein the electro-optical scanning element (8) is disposed at a desired location and the light signal is transmitted via light guides (9).

7. Device as claimed in claim 1, wherein the voltage applied to the stripshaped conductors (1) and/or to the back electrode (10) for the purpose of recording is variable.

* * * * *